(12) United States Patent
Takanashi

(10) Patent No.: US 10,088,587 B2
(45) Date of Patent: Oct. 2, 2018

(54) SIGNAL PROCESSING DEVICE AND SIGNAL PROCESSING METHOD

(71) Applicant: Japan Oil, Gas and Metals National Corporation, Tokyo (JP)

(72) Inventor: Mamoru Takanashi, Tokyo (JP)

(73) Assignee: JAPAN OIL, GAS AND METALS NATIONAL CORPORATION, Tokyo (JP)

( * ) Notice: Subject to any disclaimer, the term of this patent is extended or adjusted under 35 U.S.C. 154(b) by 311 days.

(21) Appl. No.: 14/921,383

(22) Filed: Oct. 23, 2015

(65) Prior Publication Data

US 2016/0041281 A1 Feb. 11, 2016

Related U.S. Application Data

(63) Continuation of application No. PCT/JP2014/061750, filed on Apr. 25, 2014.

(30) Foreign Application Priority Data

Apr. 26, 2013 (JP) .................. 2013-094095

(51) Int. Cl.
*G01V 1/30* (2006.01)
*G01V 1/28* (2006.01)

(52) U.S. Cl.
CPC ............. *G01V 1/303* (2013.01); *G01V 1/282* (2013.01); *G01V 1/28* (2013.01); *G01V 1/30* (2013.01);
(Continued)

(58) Field of Classification Search
USPC ......................................................... 702/6
See application file for complete search history.

(56) References Cited

U.S. PATENT DOCUMENTS 4,972,383 A * 11/1990 Lailly .................. G01V 1/282
367/38
6,018,499 A 1/2000 Sethian et al.
(Continued)

FOREIGN PATENT DOCUMENTS

JP 2011-509412 A 3/2011

OTHER PUBLICATIONS

Notification of Transmittal of Translation of the International Preliminary Report on Patentability for PCT Application No. PCT/JP2014/061750; dated Nov. 5, 2015; The International Bureau of WIPO; Geneva, Switzerland.
(Continued)

*Primary Examiner* — Paul D Lee
(74) *Attorney, Agent, or Firm* — Thomas E. Lees, LLC

(57) ABSTRACT

A signal processing device includes a propagation speed calculating means for calculating strength and a direction of vibration in an underground structure region using a calculation model including data of a vibration propagation speed; a simulated propagation speed calculating means for inputting seismic source information to a calculation model and calculating the strength and the direction of the vibration in the underground structure region using the calculation model; and an update amount calculating means for calculating an update amount to update the calculation model, on the basis of propagation speed distribution information and simulated propagation speed distribution information. The calculation model is a solid model, the propagation speed calculating means calculates strength and a direction of first vibration using a first measurement signal input to the calculation model and calculates strength and a direction of second vibration using a second measurement signal input to the calculation model.

12 Claims, 9 Drawing Sheets

(52) U.S. Cl.
CPC .. *G01V 2210/6122* (2013.01); *G01V 2210/67* (2013.01)

(56) References Cited

U.S. PATENT DOCUMENTS

| | | | | |
|---|---|---|---|---|
| 2009/0192716 A1* | 7/2009 | Molenaar | ............ | G01V 1/30 |
| | | | | 702/11 |
| 2010/0030479 A1* | 2/2010 | Higginbotham | ....... | G01V 1/303 |
| | | | | 702/18 |
| 2010/0114494 A1* | 5/2010 | Higginbotham | ......... | G01V 1/28 |
| | | | | 702/16 |
| 2012/0051177 A1* | 3/2012 | Hardage | ............ | G01V 1/286 |
| | | | | 367/43 |
| 2013/0028052 A1* | 1/2013 | Routh | ................ | G01V 1/28 |
| | | | | 367/43 |
| 2013/0060544 A1* | 3/2013 | Bakker | ............ | G01V 1/28 |
| | | | | 703/2 |

OTHER PUBLICATIONS

J. Yan and P. Sava; "Isotropic angle-domain elastic reverse-time migration"; Geophysics, vol. 73, No. 6; 2008; pp. S229-S239.

T. Watanabe, S. Shimizu, E. Asakawa and T. Matsuoka; "Differential waveform tomography for time-lapse crosswell seismic data with application to gas hydrate production monitoring"; SEG International Exposition and 74th Annual Meeting, Oct. 2004; pp. 2323-2326.

International Search Report for PCT Application No. PCT/JP2014/061750; dated Jul. 15, 2014; Japanese Patent Office; Japan.

* cited by examiner

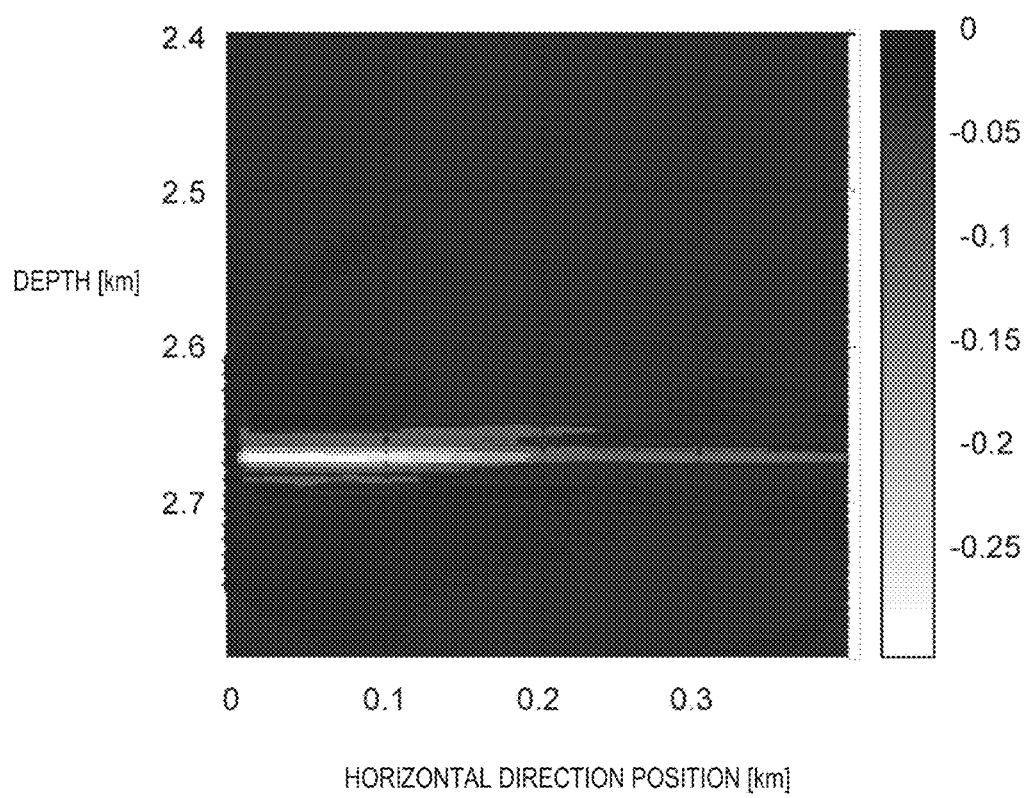

SIGNAL PROCESSING DEVICE AND SIGNAL PROCESSING METHOD

CROSS-REFERENCE TO RELATED APPLICATIONS

This is a Continuation application of International Application Serial No. PCT/JP2014/061750 filed on Apr. 25, 2014, which claims the benefit of Japanese Application No. P2013-094095 filed on Apr. 26, 2013, the disclosures of which are hereby incorporated by reference.

BACKGROUND

The present invention relates to a signal processing device and a signal processing method.

Technology for grasping a structure of an underground geological layer to recover underground resources is known. For example, technology for imaging the structure of the underground geological layer using measured seismic waves is known. For example, a method of analyzing seismic waves propagating through the geological layer is known.

BRIEF SUMMARY

Technical Problem

A method using enhanced oil recovery is known as a method of recovering crude oil components left in an oil layer in an oilfield in which production decreases. In the enhanced oil recovery, carbonic acid gas is injected into the oil layer from an injection well and crude oil is recovered from a production well. For example, the carbonic acid gas is injected into the well and oil of the oil layer is extruded by the injected carbonic acid gas. Therefore, recovery efficiency of the underground oil is improved.

As gas used in the enhanced oil recovery, carbonic acid gas containing carbon dioxide, hydrocarbon gas having a carbon number less than 5, or nitrogen gas is used, for example.

A significant challenge in the enhanced oil recovery is to grasp an underground structure on how does the injected carbonic acid gas diffuse in the oil layer of the oilfield.

One aspect of the present invention has been made in view of the above problems. It is an object of one aspect of the present invention to provide a signal processing device and a signal processing method that can image an underground structure at the time of using enhanced oil recovery, on the basis of information of observed seismic waves.

Solution to Problem

To achieve the above object, the inventors have repeated studies zealously and have found that propagation speed information including strength and a direction of vibration is calculated from a plurality of measurement signals including information of vibrations of a plurality of timings using a calculation model and a propagation speed distribution of the vibration is imaged with high precision. One aspect of the present invention has been finished as a result of further examination based on this knowledge.

A signal processing device according to one aspect of the present invention is a signal processing device that processes a measurement signal received by a vibration receiving means receiving vibration generated by a vibration generating means generating the vibration in an underground structure region having a plurality of regions of vibration propagation speeds, the signal processing device including: a measurement signal accumulating means for accumulating a first measurement signal having received first vibration generated by the vibration generating means and a second measurement signal having received second vibration generated at a time interval from generation of the first vibration; a vibration propagation speed data accumulating means for accumulating data of the vibration propagation speed; a propagation speed calculating means for calculating strength and a direction of the vibration in the underground structure region using a calculation model including the data of the vibration propagation speed; a propagation speed distribution information accumulating means for accumulating propagation speed distribution information in the underground structure region calculated by the propagation speed calculating means; a simulated signal input means for inputting seismic source information obtained by simulating the vibration generating means to the calculation model; a simulated propagation speed calculating means for inputting the seismic source information to the calculation model by the simulated signal input means and calculating the strength and the direction of the vibration in the underground structure region using the calculation model; a simulated propagation speed distribution information accumulating means for accumulating simulated propagation speed distribution information calculated by the simulated propagation speed calculating means; an update amount calculating means for calculating an update amount to update the calculation model, on the basis of the propagation speed distribution information and the simulated propagation speed distribution information; and an updating means for updating the calculation model using the update amount, wherein the calculation model is a solid model, and the propagation speed calculating means calculates strength and a direction of the first vibration using the first measurement signal input to the calculation model and calculates strength and a direction of the second vibration using the second measurement signal input to the calculation model.

In the signal processing device according to one aspect of the present invention, the vibration received by the vibration receiving means is calculated by the propagation speed calculating means using the calculation model, so that the propagation speed distribution information at two different timings is calculated from the vibration. For example, the seismic waves are generated by the vibration generating means for a partial geological layer of the underground structure region, so that the propagation speed distribution information at the two different timings for the propagation speed of the seismic waves in the geological layer is calculated. The propagation speed of the seismic waves depends on a petrophysical property such as the density of the geological layer. For this reason, an injection state of gas or the like in the underground structure region as well as the underground structure can be known from the imaged propagation speed distribution at the two different timings.

The signal processing device according to one aspect of the present invention may further include a measurement signal input means for inputting the first measurement signal having received the first vibration generated by the vibration generating means and the second measurement signal having received the second vibration generated at the time interval from the generation of the first vibration and a display means for displaying the propagation speed distribution information. The display means may compare and display first propagation speed distribution information calculated from the first vibration by the propagation speed calculating means and second propagation speed distribution information calculated from the second vibration by the propagation speed calculating means.

According to this configuration, because the propagation speed distribution information is displayed by the display means, the propagation speed distribution information of the seismic waves included in the vibration can be imaged. As a result, the injection state of the gas or the like in the underground structure region can be easily known.

In addition, in the signal processing device according to one aspect of the present invention, the first measurement signal and the second measurement signal may be measurement signals including vibration of a channel wave in the vicinity of a characteristic layer in the region of the different vibration propagation speed.

According to this configuration, the propagation speed distribution in the vicinity of the characteristic layer is imaged, so that the injection state of the gas or the like in the vicinity of the underground characteristic layer can be grasped more specifically.

In addition, in the signal processing device according to one aspect of the present invention, the propagation speed calculating means may calculate the strength and the direction of the vibration by backward propagation using the calculation model, the simulated propagation speed calculating means may calculate the strength and the direction of the vibration by forward propagation using the calculation model, and the update amount calculating means may set a value obtained by calculating a mutual correlation of the propagation speed distribution information and the simulated propagation speed distribution information as the update amount.

According to this configuration, the calculation model is updated, so that a calculation model capable of explaining the propagation speed distribution information included in the acquired vibration is obtained with high precision. For this reason, the injection state of the gas or the like in the vicinity of the underground characteristic layer can be specified more specifically.

In addition, in the signal processing device according to one aspect of the present invention, the update amount calculating means may set a value obtained by calculating a mutual correlation of a P-wave component of the propagation speed distribution information and a P-wave component of the simulated propagation speed distribution information as the update amount.

According to this configuration, the calculation model is updated according to a mutual correlation degree of a P wave, so that a calculation model capable of explaining the propagation speed distribution information included in the acquired measurement signal is obtained with high precision. For this reason, the injection state of the gas or the like in the vicinity of the underground characteristic layer can be specified more specifically.

In addition, in the signal processing device according to one aspect of the present invention, the second propagation speed distribution information may be calculated by a sum of the first propagation speed distribution information and the update amount.

According to this configuration, because time necessary for the signal process can be shortened, propagation speed distribution information included in vibration acquired after predetermined time passes can be imaged easily.

In addition, in the signal processing device according to one aspect of the present invention, the propagation speed calculating means may use a difference of the first measurement signal and the second measurement signal input to the calculation model to calculate strength and a direction of the difference and the display means may display propagation speed difference distribution information calculated from the difference by the propagation speed calculating means.

According to this configuration, a temporal change of a structure in the underground structure region can be easily known by obtaining propagation speed information from a difference of vibrations generated at different times and imaging obtained propagation speed difference distribution information.

In addition, in the signal processing device according to one aspect of the present invention, the first measurement signal and the second measurement signal may include vibration arriving earlier than an S-wave body and the display means may target the vibration of the channel wave arriving earlier than the S-wave body of each of the first propagation speed distribution information and the second propagation speed distribution information.

According to this configuration, the propagation speed calculating means and the simulated propagation speed calculating means execute calculation using the P-wave component in the propagation speed information. For this reason, propagation speed distribution information is calculated without using the S-wave component in which reflection of the seismic waves can be superimposed. Therefore, the injection state of the gas or the like in the vicinity of the underground characteristic layer can be specified more specifically.

In addition, in the signal processing device according to one aspect of the present invention, the propagation speed calculating means may use a difference of the first measurement signal and the second measurement signal input to the calculation model to calculate strength and a direction of the difference in time series and the display means may display propagation speed difference distribution information calculated from the difference by the propagation speed calculating means in time series.

According to this configuration, the propagation speed difference distribution information can be displayed in time series. As a result, a temporal change of the injection state of the gas or the like in the underground structure region can be easily known.

However, one aspect of the present invention can be described as the signal processing device as described above and can be described as a signal processing method as follows. The signal processing method achieves the same function and effect as the function and effect of the signal processing device.

A signal processing method according to one aspect of the present invention is a signal processing method that is executed by a signal processing device to process a measurement signal received by a vibration receiving step of receiving vibration generated by a vibration generating step of generating the vibration in an underground structure region having a plurality of regions of vibration propagation speeds. The signal processing method includes a measurement signal accumulating step of accumulating a first measurement signal having received first vibration generated by the vibration generating step and a second measurement signal having received second vibration generated at a time interval from generation of the first vibration; a vibration propagation speed data accumulating step of accumulating data of the vibration propagation speed; a propagation speed calculating step of calculating strength and a direction of the vibration using a calculation model including the data of the vibration propagation speed; a propagation speed distribution information accumulating step of accumulating propagation speed distribution information calculated by the propagation speed calculating step; a simulated signal input step of inputting seismic source information obtained by simulating the vibration generating step to the calculation model; a simulated propagation speed calculating step of inputting the seismic source information to the calculation model by the simulated signal input step and calculating the strength and the direction of the vibration using the calculation model; a simulated propagation speed distribution information accumulating step of accumulating simulated propagation speed distribution information calculated by the simulated propagation speed calculating step; an update amount calculating step of calculating an update amount to update the calculation model, on the basis of the propagation speed distribution information and the simulated propagation speed distribution information; an updating step of updating the calculation model using the update amount; and a display step of displaying the propagation speed distribution information. The calculation model is a solid model and the propagation speed calculating step calculates strength and a direction of the first vibration using the first measurement signal input to the calculation model and calculates strength and a direction of the second vibration using the second measurement signal input to the calculation model.

Advantageous Effects of Invention

According to one aspect of the present invention, a signal processing device and a signal processing method that can image an underground structure at the time of using enhanced oil recovery, on the basis of information of observed seismic waves, can be provided.

BRIEF DESCRIPTION OF DRAWINGS

FIG. 9 is a diagram illustrating a result of the numerical calculation according to the embodiment.

DETAILED DESCRIPTION

Hereinafter, an embodiment will be described in detail. In description of the drawings, like numerals denote like elements and overlapped explanation is omitted.

Figure 1:
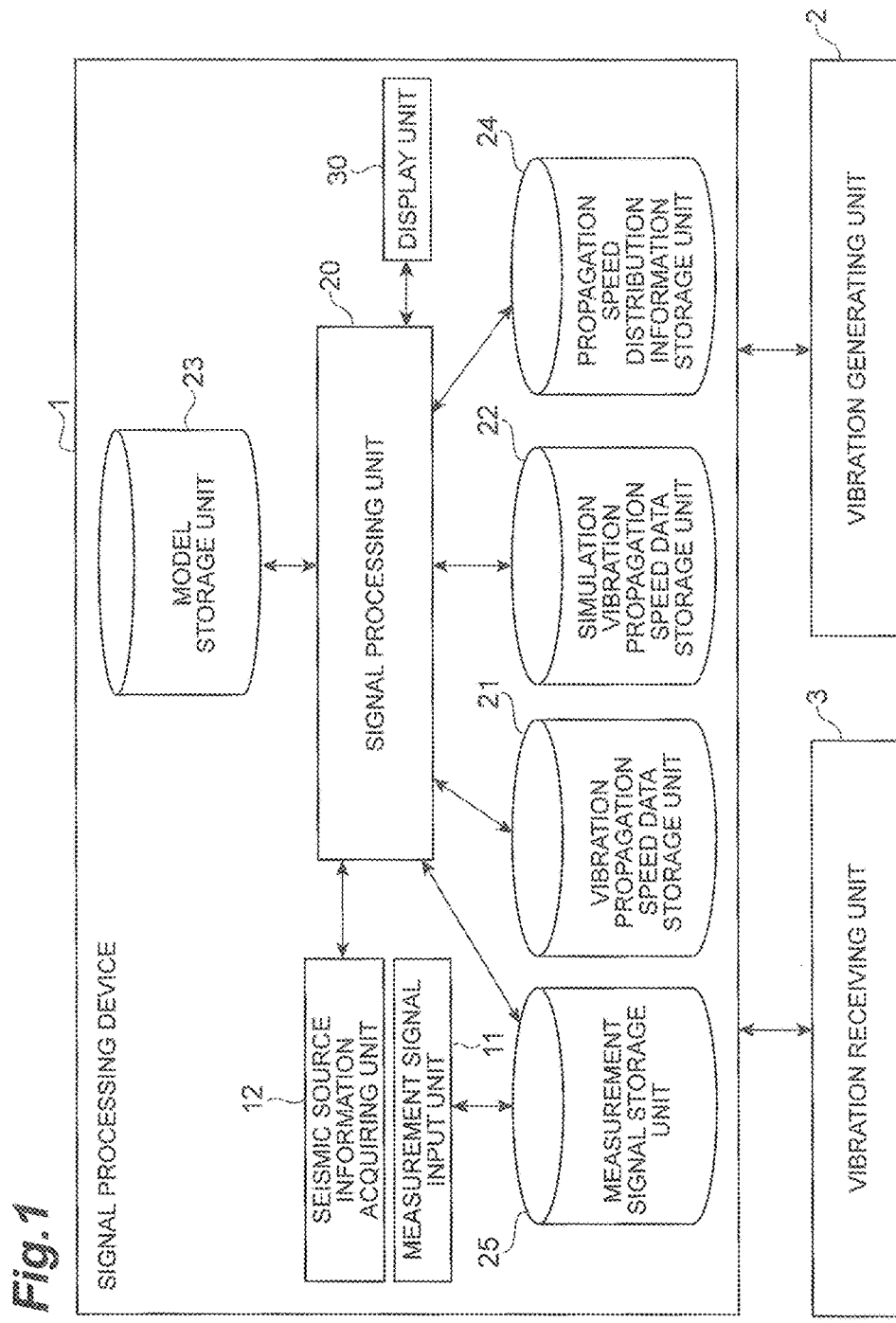
FIG. 1 is a functional block diagram illustrating an embodiment.

FIG. 1 is a functional block diagram of a signal processing device according to the embodiment. A signal processing device 1 may be applied to a signal processing device to analyze observation data including seismic waves in an underground structure region having a plurality of regions of vibration propagation speed characteristics. The underground structure region is a region of a structure of an underground geological layer, for example. The underground structure region has a plurality of regions in which vibration propagation speeds to propagate vibration are different from each other, for example. The underground structure region is a gas component dissolution region of an oil layer of an oilfield, for example.

As a method of estimating a diffusion situation of carbonic acid gas injected into the oil layer in enhanced oil recovery, a seismic exploration method is known. The seismic exploration method is called a seismic method. In the seismic exploration method, two observation wells provided to penetrate the oil layer are used. The two observation wells are separated from each other. In one observation well, a vibration source (seismic source) is provided in the vicinity of the oil layer. In the other observation well, a signal detecting means is arranged to penetrate the oil layer. In this method, the following measurement is executed. Vibration is generated by the vibration source in one observation well and the vibration is detected by the signal detecting means in the other observation well, so that observation data is measured. The measurement is executed before injecting gas and after injecting the gas. Observation data measured before injecting the gas and observation data measured after injecting the gas are compared with each other.

The signal processing device 1 can be applied to a signal processing device to analyze the measured observation data in the seismic exploration method. In the oil layer, propagation of the vibration is slower than that in the surrounding geological layer. In addition, in a region where gas diffuses, propagation of the vibration is slower than that in the oil layer. In the seismic exploration method, a plurality of extensions of regions where gas is injected (gas injection regions) are assumed. In the seismic exploration method, the observation data and a propagation simulation of the vibration generated from the vibration source are compared with each other, so that the extensions of the gas injection regions are estimated.

In the seismic exploration method, inversion analysis is used as a method of analyzing the measured observation data. A signal used for the inversion analysis is a signal by which the vibration generated from the vibration source is received by the signal detecting means. The signal may be a signal from which the vibration passing through the oil layer is detected. Time retroacting is executed on the received signal according to a propagation characteristic of elastic waves of a geological layer model, so that propagation of the elastic waves is estimated. As a result, a propagation situation of the geological layer model can be reproduced.

At the time of being used for a confirmation of a gas diffusion situation in the enhanced oil recovery, the vibration source, a spatial arrangement of sensors, a phase of the vibration of the vibration source, and strength of the vibration of the vibration source are substantially under the same conditions, before injecting the gas and after injecting the gas. In addition, a difference of signals measured before and after injecting the gas is inversely analyzed, so that a region in which a propagation speed is changed can be grasped directly.

As illustrated in FIG. 1, the signal processing device 1 according to this embodiment mainly includes a measurement signal input unit 11, a seismic source information acquiring unit 12, a signal processing unit 20, a vibration propagation speed data storage unit 21, a simulated vibration propagation speed data storage unit 22, a model storage unit 23, a propagation speed distribution information storage unit 24, a measurement signal storage unit 25, and a display unit 30. In addition, the signal processing device 1 and a vibration generating unit 2 and a vibration receiving unit 3 are connected via a wired or wireless network. Hereinafter, functions of the individual units will be generally described.

The signal processing device 1 processes a measurement signal received by the vibration receiving unit 3 (vibration receiving means) that receives vibration generated by the vibration generating unit 2 (vibration generating means) to generate the vibration with respect to an underground structure region having a plurality of regions of vibration propagation speed characteristics.

The vibration generating unit 2 is an artificial seismic source that generates elastic wave energy. The artificial seismic source may be a seismic source device called a seismic source, for example. As the artificial seismic source, a vibrator in which a weight is attached eccentrically to a rotation shaft of a motor or a piezoelectric element is exemplified. In addition, the artificial seismic source may be an artificial seismic source using the piezoelectric element. The elastic waves are triggered by the seismic source. The seismic source device is arranged at a predetermined depth in a depth direction of a well, for example. An earthquake of the strength not felt by each individual person may be triggered by the seismic source device.

The vibration receiving unit 3 is a receiver that measures elastic wave energy. The receiver may be a seismometer, for example. A data storage device (not illustrated in the drawings) is connected to the vibration receiving unit 3 and the vibration receiving unit 3 may record an acquired signal by the data storage device. The receiver is provided over the entire well along the depth direction of the well, for example. As a vibration detecting element adopted in the receiver, a vibration detecting element of a microphone system is heavily used in the related art. In this embodiment, the receiver may be a vibration detecting element of an MEMS system. The vibration detecting element of the MEMS system has a superior low frequency characteristic and can detect vibration of a low frequency. The vibration detecting element of the MEMS system can detect vibration of a low frequency lower than 20 Hz. The vibration detecting element of the MEMS system can detect vibration of a low frequency lower than 10 Hz. The vibration detecting element of the MEMS system can detect vibration of a low frequency lower than 5 Hz.

The measurement signal input unit 11 (measurement signal input means) inputs a first measurement signal and a second measurement signal. The first measurement signal is a measurement signal that is obtained by receiving first vibration generated from the vibration generating unit 2 by the vibration receiving unit 3. The second measurement signal is a measurement signal that is obtained by receiving second vibration generated from the vibration generating unit 2 by the vibration receiving unit 3. The second vibration is generated at a time interval from generation of the first vibration.

The vibration generated from the vibration generating unit 2 to be the vibration source is seismic waves, for example. The seismic waves propagate spherically in order of a P wave and an S wave basically. The seismic waves arrive at the vibration receiving unit 3 while repeating refraction and reflection, according to a vibration propagation speed of the geological layer. At this time, acceleration or displacement according to the vibration is recorded by individual vibration detecting means included in the vibration receiving unit 3, using vibration start time of the vibration source as a starting point. The acceleration or the displacement according to the vibration is recorded at a predetermined sampling rate. The sampling rate is set to be equal to or higher than 2× of a vibration frequency of the vibration source and lower than 256× of the vibration frequency. The sampling rate may be set to be equal to or higher than 8× and lower than 256×, for example. The sampling rate may be set to be equal to or higher than 16× and lower than 256×, for example.

Data of the same position and the same time using the vibration start time as the starting point are extracted from the first vibration data and the second vibration data and a difference thereof is obtained. If there is no influence of the gas injection, the difference is zero. When a region of a vibration propagation speed of a characteristic layer (oil layer) different from another region is generated by the injection of the gas, a difference is generated in the vibration propagation speed due to the region. In addition, channel waves appearing earlier than an S-wave body in the vicinity of the characteristic layer may be specified as input data on an imaging device and components thereof may be input.

That is, a first measurement signal and a second measurement signal obtained at two time timings at which regions of different vibration propagation speeds are generated are measurement signals that include vibration in the vicinity of the characteristic layer in the region of the different vibration propagation speed in the underground structure region.

The measurement signal input unit 11 receives an input of the measurement signal received by the vibration receiving unit 3. The measurement signal includes information of the elastic waves propagated from the seismic source. The measurement signal may be difference data of a time direction of data measured at a predetermined time interval. In addition, a signal recorded in the data storage device may be input as the measurement signal to the measurement signal input unit 11.

For example, when this embodiment is applied to the enhanced oil recovery, the first measurement signal before injecting the carbonic acid gas and the second measurement signal immediately after injecting the carbonic acid gas may be input to the measurement signal input unit 11. In addition, the second measurement signal may be input after predetermined time passes from the injection of the carbonic acid gas. In this case, the predetermined time is a month and the measurement signal input unit 11 may acquire the second measurement signal several times for every month.

The measurement signal input unit 11 stores the acquired measurement signal in the measurement signal storage unit 25 (measurement signal accumulating means). In addition, the measurement signal input by the measurement signal input unit 11 may not be stored in the measurement signal storage unit 25 and may be delivered directly to the signal processing unit 20.

The signal processing unit 20 (vibration propagation speed data accumulating means) executes a signal process on the measurement signal read from the propagation speed distribution information storage unit 24 using a calculation model and accumulates obtained data of the vibration propagation speed.

Here, the calculation model used in this embodiment will be described. The calculation model is a solid model and is a propagation model of the elastic waves. The calculation model is stored in the model storage unit 23. The calculation model is given by the following formula.

[Formula 1]

$$\rho \frac{\partial^2 u}{\partial t^2} = f + (\lambda + 2\mu)\nabla(\nabla \cdot u) - \mu \nabla \times \nabla \times u \quad (1)$$

The formula (1) is a formula representing time evolution of a vector field u showing a variation of a wave field. In the formula (1), a density ρ is a parameter representing a density of a propagation medium and constants λ and μ are parameters called Lamé parameters. The density of the propagation medium is a density of a medium of the region in the underground structure region. A vector f is external force applied to the vector field u. The vector field u is a function of time and a space.

In addition, a relation of the vector field u and the P wave and the S wave of the elastic waves is given by the following formula.

[Formula 2]

$$u = \nabla\Phi + \nabla \times \Psi \quad (2)$$

Here, $\nabla\Phi$ of a first term of a right side corresponds to the P wave and $\nabla \times \Psi$ of a second term of the right side corresponds to the S wave.

In addition, a speed Vp of the P wave and a speed Vs of the S wave are in a relation given by the following formula, by the density ρ of the propagation space and the Lamé parameters λ and μ.

[Formula 3]

$$Vp = \sqrt{\frac{\lambda + 2\mu}{\rho}} \quad (3)$$

[Formula 4]

$$Vs = \sqrt{\frac{\mu}{\rho}} \quad (4)$$

As such, the solid model used in this embodiment is a calculation model in which a propagation speed of the elastic waves is formulated. Particularly, the solid model is a calculation model depending on a P-wave speed and an S-wave speed of the seismic waves. As such, a solid model having considering both the P wave and the S wave is adopted as the solid model, so that a propagation speed change region of the characteristic layer can be detected with resolution corresponding to about 1/10 of a wavelength.

For example, the elastic waves propagate fast in a medium containing a large amount of hard rock such as limestone. By using the solid model, a physical characteristic of the medium through which the elastic waves propagate can be represented. The physical characteristic may be porosity (airspace) of the rock becoming the medium, for example. Or, the physical characteristic may be a physical amount such as anisotropy of the rock, a preferred orientation of mineral crystal, and a preferred orientation of a crack. Or, the physical characteristic may be a characteristic such as shear deformation rate of the rock and shear force of the rock.

The signal processing unit 20 executes inversion analysis of the measurement signal using the solid model. The signal processing unit 20 (propagation speed calculating means) calculates strength and a direction of the vibration of the underground structure region by backward propagation using the solid model and the signal processing unit 20 (simulated propagation speed calculating means) calculates the strength and the direction of the vibration by forward propagation using the solid model. That is, the propagation of the elastic waves is demodulated from the measurement signal, so that a speed and a direction included in the measurement signal of the underground structure region through which the elastic waves propagate are extracted. A simulated signal is calculated in a forward direction while the measurement signal is analyzed by the backward propagation and the solid model is updated using an analysis result and the simulated signal. As a result, the measurement signal can be analyzed with high precision.

In detail, the signal processing unit 20 (propagation speed calculating means) calculates the strength and the direction of the vibration using the solid model including the data of the vibration propagation speed. The signal processing unit 20 may calculate the strength and the direction of the vibration in time series. The calculated strength and direction of the signal are stored in the vibration propagation speed data storage unit 21. Here, the signal process is executed on the measurement signal using the solid model, reflection waves of the elastic waves are extracted, and distribution information of the propagation speed including the strength of the elastic waves and the propagation direction of the elastic waves is calculated. The signal processing unit 20 accumulates the calculated propagation speed distribution information in the propagation speed distribution information storage unit 24 (propagation speed distribution information accumulating means).

The propagation speed distribution information of the elastic waves may include a P-wave component of the seismic waves and an S-wave component of the seismic waves. The signal process is executed on the measurement signal by the signal processing unit 20, so that speed information of the P-wave component of the seismic waves and the S-wave component of the seismic waves is extracted. The extracted speed information is stored in the vibration propagation speed data storage unit 21. In addition, the signal processing unit 20 may execute the signal process using data until the S wave arrives at the vibration receiving unit 3. In the signal process, a filter process may be applied. By the filter process, a noise can be attenuated by finding a difference between the signal and the noise.

Here, the signal processing unit 20 (propagation speed calculating means) may use a difference of the first measurement signal and the second measurement signal input to the solid model to calculate the strength and the direction of the difference. In addition, the first measurement signal and the second measurement signal may include vibration arriving earlier than the S-wave body and when the signal process is executed on the first measurement signal and the second measurement signal, the signal process may be executed on only the vibration arriving earlier than the S-wave body. Channel waves generated in the vicinity of the characteristic layer and arriving earlier than the S-wave body are analyzed, so that the analysis can be effectively executed.

In addition, the signal processing unit 20 calculates simulated data obtained by simulating propagation of the seismic waves (elastic waves) from the seismic source information, using the seismic source information and the seismic wave propagation model. The simulated data calculated by the signal processing unit 20 is stored in the simulated vibration propagation speed data storage unit 22. The seismic source information is information obtained by simulating the vibration generated by the vibration generating unit 2 and is time when the earthquake is triggered, a place where the earthquake is triggered, or strength at which the earthquake is triggered, for example. The signal processing unit 20 inputs seismic source information as an initial condition of the external force f of the solid model, executes calculation, and calculates simulated data. The simulated data shows strength of a vibration wave at each time in each region.

The signal processing unit 20 calculates a correlation of the observation data and the simulated data. In addition, the signal processing unit 20 (updating means) updates the seismic wave propagation model, on the basis of the correlation calculated by the signal processing unit 20. That is, the signal processing unit 20 updates the Lamé parameters and the density of the solid model. The signal processing unit 20 may calculate propagation speed information of the seismic wave using the observation data and the simulated data.

The propagation speed information of the seismic waves calculated by the signal processing unit 20 may be speed information included in the observation data until the S wave of the seismic waves arrives. The solid model used by the signal processing unit 20 is a seismic wave propagation model and is a calculation model to simulate the propagation of the elastic waves. The seismic wave propagation model is a calculation model depending on the P-wave component of the seismic waves, the S-wave component of the seismic waves, and the density of the medium. The analyzed propagation speed information of the vibration is stored in the vibration propagation speed data storage unit 21.

In detail, the signal processing unit 20 (simulated signal input means) receives an input of the seismic source information from the seismic source information acquiring unit 12. The signal processing unit 20 (simulated propagation speed calculating means) inputs the seismic source information to the solid model and calculates the strength and the direction of the vibration using the solid model. In addition, the signal processing unit 20 (propagation speed calculating means) calculates the strength and the direction of the first vibration using the first measurement signal input to the solid model and calculates the strength and the direction of the second vibration using the second measurement signal input to the calculation model. The signal processing unit 20 accumulates the calculated simulated propagation speed distribution information in the simulated vibration propagation speed data storage unit 22 (simulated propagation speed distribution information accumulating means).

In addition, the second propagation speed distribution information may be calculated by a sum of the first propagation speed distribution information and an update amount to be described below. If a configuration described above is used, time necessary for the signal process can be shortened. Therefore, propagation speed distribution information included in vibration acquired after predetermined time passes can be imaged easily.

In addition, the signal processing unit 20 (update amount calculating means) calculates an update amount to update the solid model, on the basis of the propagation speed distribution information and the simulated propagation speed distribution information. The signal processing unit 20 may use a value obtained by calculating a mutual correlation of the propagation speed distribution information and the simulated propagation speed distribution information as the update amount. The mutual correlation is a cross-correlation, for example. A difference of propagation speed distributions in a space becomes clear by calculating a mutual correlation amount and comparing the propagation speed distribution information and the simulated propagation speed distribution information. By updating the parameters of the solid model using the calculated mutual correlation amount, the solid model can be updated such that the difference of the propagation speeds represented by the propagation speed information and the simulated propagation speed information decreases. The speed Vp of the P-wave component of the solid model may be updated such that the mutual correlation amount increases. Because the speed Vp is related to the density $\rho$ and the Lamé parameters $\lambda$ and $\mu$ as described above, a value of the density $\rho$ may be updated when the speed Vp is updated, for example.

The signal processing unit 20 (updating means) updates the solid model using the update amount. The signal processing unit 20 may use a speed difference of the P wave as a change amount and update the seismic wave propagation model (solid model) stored in the model storage unit 23. The update amount is not limited to the P-wave speed component and may be the S-wave speed component or a parameter of other solid model.

The display unit 30 (display means) displays the propagation speed distribution information. The display unit 30 may display propagation speed difference distribution information calculated from the difference of the measurement signals by the propagation speed calculating means. The display unit 30 may display the propagation speed difference distribution information calculated from the difference by the propagation speed calculating means in time series. The display unit 30 compares the first propagation speed distribution information calculated from the first vibration and the second propagation speed distribution information calculated from the second vibration and displays a comparison result. The propagation speed distribution information displayed by the display unit 30 is stored in the propagation speed distribution information storage unit 24. For example, the display unit 30 may display the distribution information of which arrival timing is earlier than that of the S-wave body in the first propagation speed distribution information and the second propagation speed distribution information.

For example, the display unit 30 calculates a difference of the propagation speed distribution information from a plurality of received data and displays the calculated difference. For example, a difference of propagation speed distribution information acquired from a first measurement signal measured before injecting carbonic acid gas (CO2) and propagation speed distribution information obtained from a second measurement signal measured after injecting the carbonic acid gas (CO2) is displayed, so that a change of a propagation speed distribution in the underground structure region becomes clear.

Figure 2:
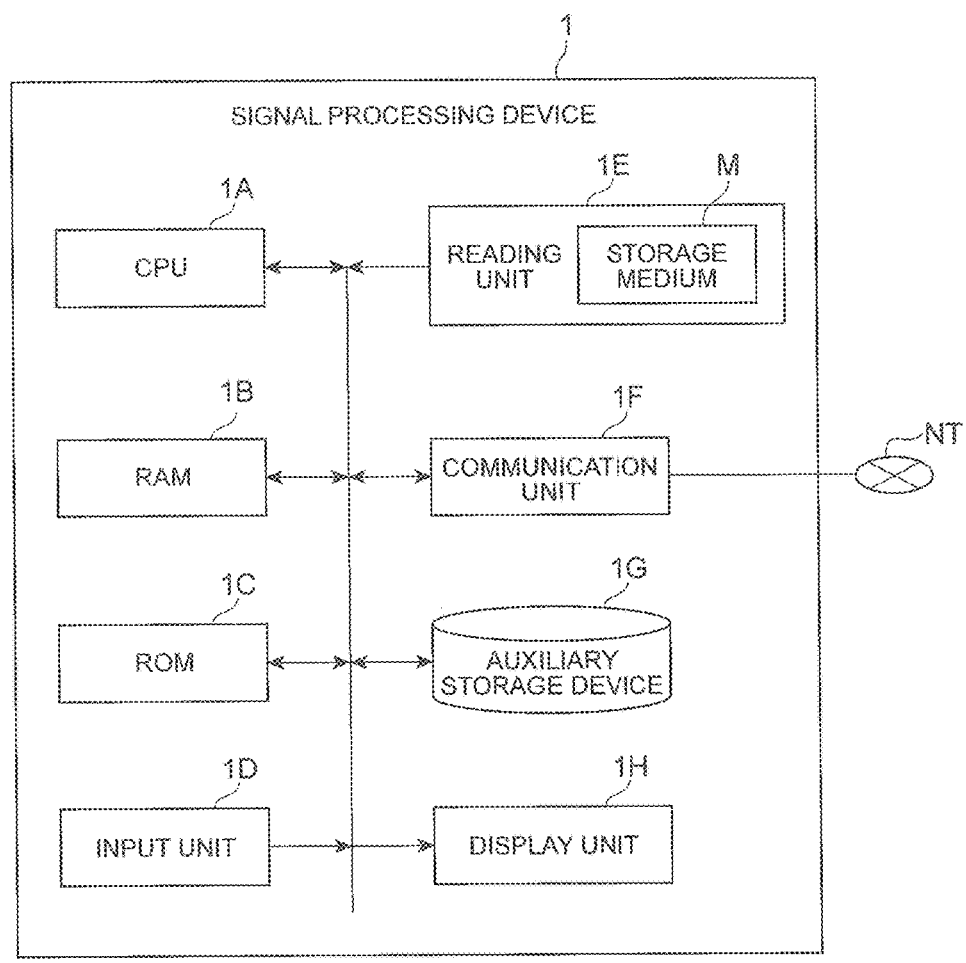
FIG. 2 is a block diagram illustrating a hardware configuration according to the embodiment.

FIG. 2 illustrates an example of a hardware configuration of the signal processing device 1. The signal processing device 1 includes a CPU 1A, RAM 1B, ROM 1C, an input unit 1D including a keyboard and a speech recognizer to input a voice, a reading unit 1E to read data or a program stored in a storage medium M inserted at a predetermined position, a communication unit 1F to perform communication with configurations other than the signal processing device 1, an auxiliary storage unit 1G, and a display unit 1H to display an image including speed information, as the hardware configuration. In addition, the communication unit 1F may be connected to a network NT. The network NT may be the Internet or an intranet. Or, the communication unit IF may be a local area network (LAN). The network NT may be connected by wireless or may be connected by wire. A function of each functional block of the signal processing device 1 described above is realized by reading a program or data by the RAM 1B and executing the program under control of the CPU 1A.

Figure 3:
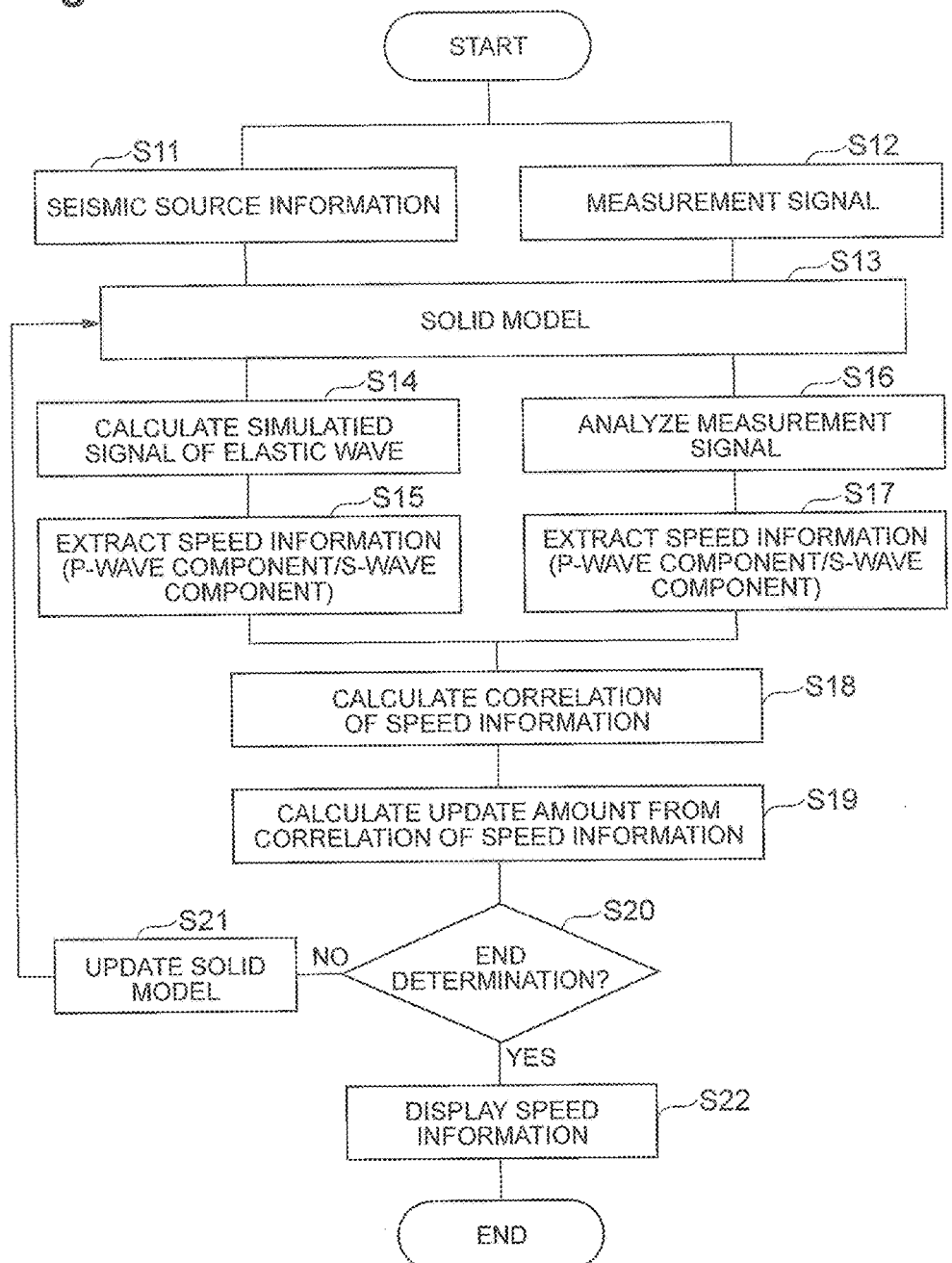
FIG. 3 is a flowchart illustrating an outline of a signal process according to the embodiment.

Next, a process (signal processing method) executed by the signal processing device 1 according to this embodiment will be described using a flowchart illustrated in FIG. 3. The process starts when a user of the signal processing device 1 executes an input operation starting analysis on the signal processing device 1. As a result, in the signal processing device 1, vibration is generated by the vibration generating unit 2 with respect to an underground structure region having a plurality of regions of vibration propagation speed characteristics (vibration generating step, S11), the generated vibration is received by the vibration receiving unit 3 (vibration receiving step, S12), and an obtained measurement signal is processed.

In measurement signal accumulation step (S12), the first measurement signal and the second measurement signal are input by the measurement signal input unit 11. Here, the measurement signal input unit 11 may be input by reading the measurement signal recorded in the storage medium M by the reading unit 1M and may be a measurement signal input via the network NT.

In step S13, the signal processing unit 20 reads the solid model from the model storage unit 23. The read solid model is the model described above. The solid model and the parameters of the solid model are stored in the model storage unit 23. By the signal processing unit 20, read of the data, accumulation of the data, and calculation using the data are performed.

In simulated signal input step (S11), seismic source information obtained by simulating the vibration generating step is input to the calculation model. In simulated propagation speed calculating step (S14), the seismic source information is read from the model storage unit 23 and is input to the calculation model and the strength and the direction of the vibration are calculated using the calculation model. As a result, the seismic source information is input to the solid model and the propagation of the elastic waves is calculated as simulated data. The calculated simulated data is a result obtained by simulating the propagation of the elastic waves and includes propagation speed information at each spot of the underground structure region in which a distance from the seismic source is different, changing at each time. In simulated propagation speed calculating step (S14), the calculated propagation speed information is accumulated (propagation speed distribution information accumulating step). Then, the simulated data is separated into P-wave/S-wave components, from horizontal/vertical components for a propagation direction of the elastic waves (S15). As a result, the propagation speed information of the elastic waves is calculated from the simulated data. In simulated propagation speed distribution information accumulating step (S15), the calculated simulated propagation speed distribution information is accumulated by the signal processing unit 20.

In propagation speed calculating step (S16), the strength and the direction of the vibration are calculated by the signal processing unit 20, using the solid model including the data of the vibration propagation speed. In propagation speed calculating step (S16), propagation speed distribution information including the calculated strength and direction of the vibration is accumulated (vibration propagation speed data accumulating step). Here, the inverse analysis of the measurement signal is executed using the same solid model as the seismic wave propagation model calculating the simulated data. In the inverse analysis, time is reversed in a seismic source direction and transmission of the elastic waves is analyzed. For this reason, the propagation of the elastic waves included in the observation data is temporally reversed and is analyzed. From an analysis result, speed information at each spot of the underground structure region is extracted. The speed information may be speed information changing at each time. At each spot of the underground structure region, a distance from the seismic source may be different. Then, the extracted speed information is separated into P-wave/S-wave components, from horizontal/vertical components for a propagation direction of the elastic waves (S17). As a result, the propagation speed information of the elastic waves is calculated from the observation data.

In step S18, a mutual correlation of the propagation speed distribution information and the simulated propagation speed distribution information is calculated. Here, a correlation of the speed information of the simulated data and the speed information of the observation data is calculated by the signal processing unit 20. For example, a mutual correction of the speed information of the simulated data and the speed information of the observation data may be calculated. As a mutual correlation amount, a cross-correlation including the P-wave component of the propagation speed information may be calculated, for example.

In update amount calculating step (S19), an update amount to update the solid model is calculated on the basis of the mutual correlation calculated in step S18. Here, the solid model is updated such that the calculated correlation of the speed information of the simulated data and the speed information of the observation data becomes high. For example, the difference of the strength and the direction of the vibration in each underground structure region represented by the propagation speed information and the simulated propagation speed information may be used as the update amount. In addition, the difference of the P-wave component in the strength and the direction of the vibration in each underground structure region represented by the propagation speed information and the simulated propagation speed information may be used as the update amount and the solid model (seismic wave propagation model) may be updated to decrease the difference.

In end determination (S20), it is determined whether the solid model is updated. The end determination is performed by determination on whether an update amount is smaller than a predetermined value. When a non-end is determined in the end determination (S20, No), the calculation model is updated by the signal processing unit 20 using the update amount in update step (S21). When a predetermined end condition is satisfied (S20; Yes), the propagation speed information is stored in the propagation speed distribution information storage unit 24.

When the end condition is satisfied (S20; Yes), in display step (S22), the propagation speed information of the seismic waves is read from the propagation speed distribution information storage unit 24 by the display unit 30 and is displayed. For example, the displayed propagation speed information is a P-wave speed. In addition, the displayed speed information may be a residual error of the P-wave speed and may be time-series speed information. In addition, the display unit 30 may display the strength and the direction of the difference of the first measurement signal and the second measurement signal calculated by the signal processing unit 20 (propagation speed calculating means) in time series.

According to the signal processing device 1 and the signal processing method described above, the vibration received by the vibration receiving means is calculated by the propagation speed calculating means using the calculation model, so that the propagation speed distribution information at two different timings is calculated from the vibration. For example, the seismic waves are generated by the vibration generating means for a partial geological layer of the underground structure region, so that the propagation speed distribution information at the two timings for the propagation speed of the seismic waves in the geological layer is calculated. The propagation speed of the seismic waves depends on a petrophysical property such as the density of the geological layer. For this reason, an injection state of gas or the like in the underground structure region as well as the underground structure can be known from the propagation speed distribution information at the two different timings displayed by the display unit 30.

In addition, a temporal change of a structure in the geological layer can be easily known by obtaining propagation speed information from a difference of vibrations generated at different times and imaging obtained propagation speed difference distribution information. For example, when this embodiment is applied to the enhanced oil recovery, a distribution state of the injected carbonic acid gas over the geological layer can be grasped.

When information of the elastic waves included in the measurement signal shows elastic waves having propagated through a surrounding portion of the characteristic layer, a propagation speed distribution is imaged. In addition, calculation is performed using the P-wave component, so that propagation speed distribution information is calculated without using the S-wave component in which reflection of the seismic waves can be superimposed. In addition, the calculation model is updated, so that a calculation model capable of explaining the propagation speed distribution information included in the acquired vibration is obtained with high precision. Therefore, the underground geological layer structure can be specified in detail.

Here, results of numerical experiments of the signal processing method in this embodiment will be described using FIGS. 4 to 9.

Figure 4:
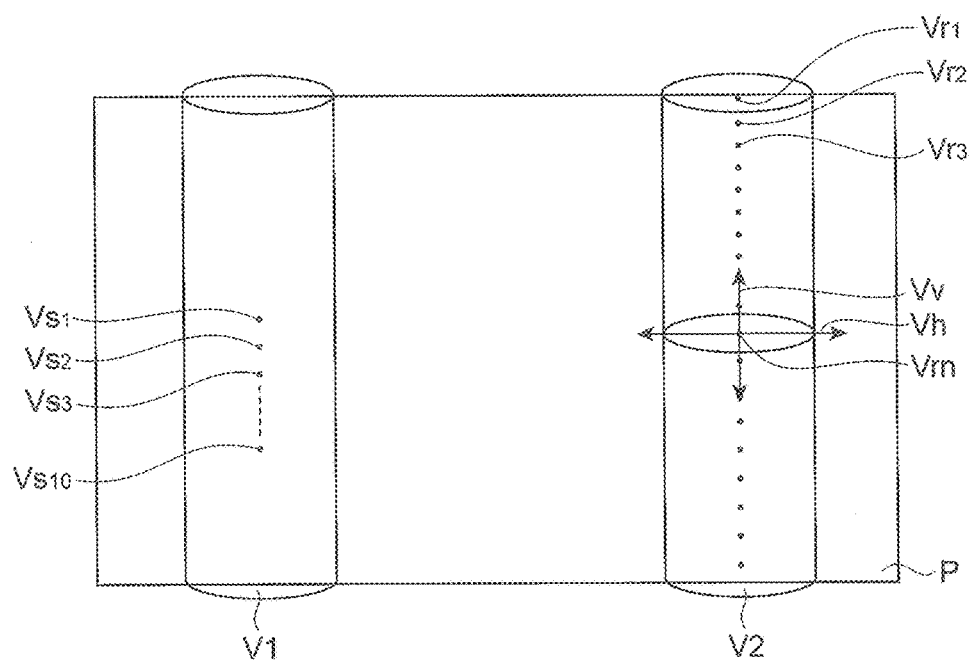
FIG. 4 is a diagram illustrating setting of numerical calculation according to the embodiment.

FIG. 4 is a schematic diagram simulatively illustrating an environment of the numerical experiment. A well V1 illustrated in FIG. 4 is an excavated well and includes seismic sources $Vs_1$ to $Vs_{10}$ corresponding to the vibration generating unit 2. Practically, the well V1 includes a plurality of artificial seismic sources in a vertical direction. Meanwhile, a well V2 illustrated in FIG. 4 is an excavated well and includes the vibration receiving unit 3 by which the earthquake is observed. The well V2 includes a plurality of seismometers $Vr_1$ to $Vr_n$ (n is an integer of 1 or more) in the vertical direction. In addition, a plane P is the same plane that includes the wells V1 and V2 and extends in the vertical direction.

Figure 5:
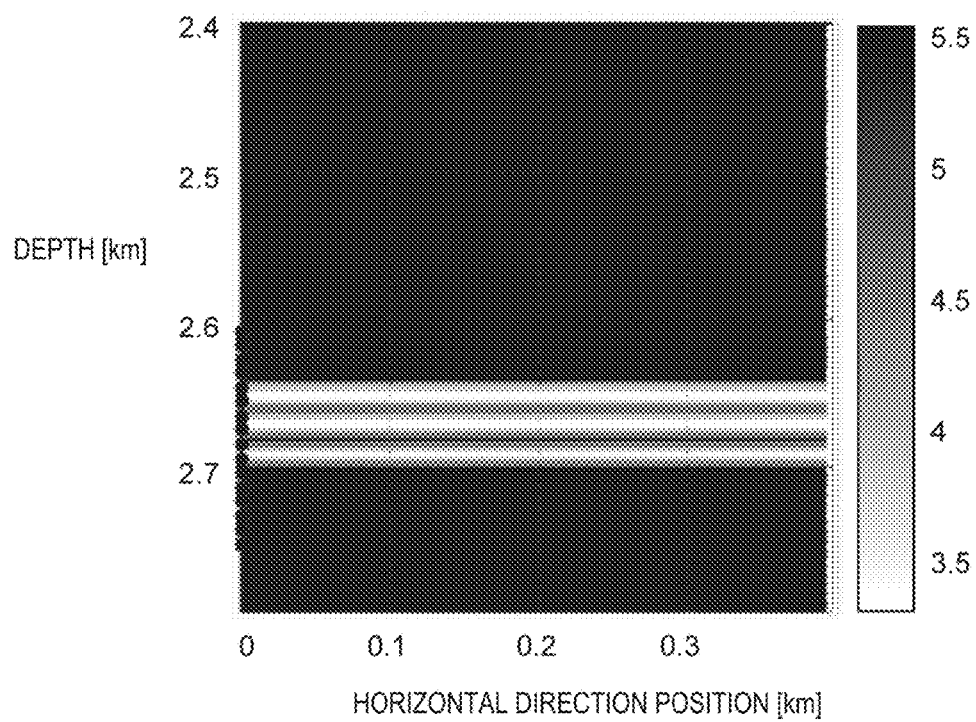
FIG. 5 is a diagram illustrating a result of the numerical calculation according to the embodiment.

As illustrated in FIG. 5, a situation where propagation speeds of the elastic waves are different along a direction of the plane P is set. In the numerical experiment, a depth from an earth's surface to a shallowest seismic source is set to about 2.6 kilometers and an inter-well distance is set to about 400 meters. However, this embodiment is not limited to the above range. For example, the inter-well distance may be 600 meters to 800 meters.

In this numerical experiment, the plurality of seismic sources $Vs_1$ to $Vs_{10}$ are assumed in the well V1. The seismic sources are shown by a plurality of black points at a spot of 0 km of a horizontal direction position in the drawings. In addition, an underground structure region where a plurality of layers of different propagation speeds are stacked in a vertical direction is assumed.

Figure 6:
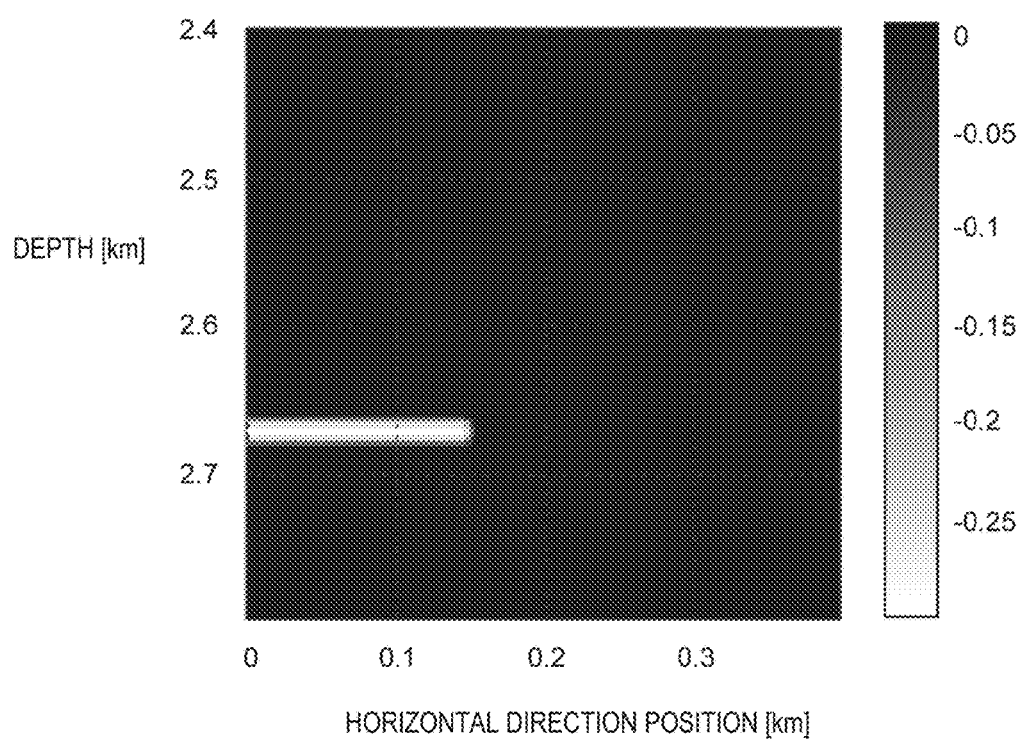
FIG. 6 is a diagram illustrating a result of the numerical calculation according to the embodiment.
Figure 7:
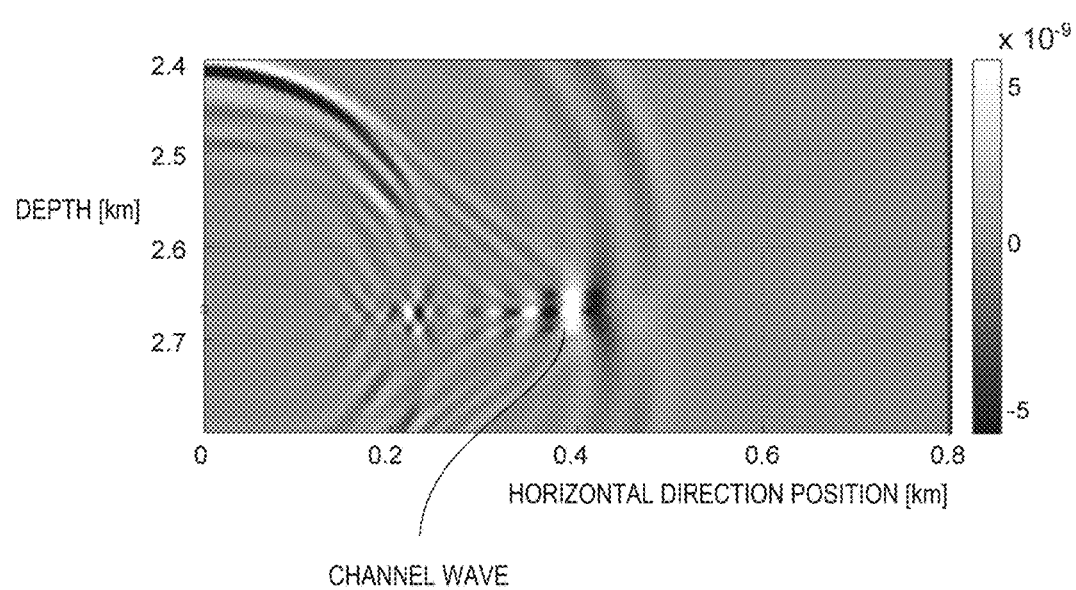
FIG. 7 is a diagram illustrating a result of the numerical calculation according to the embodiment.

As illustrated in FIG. 7, a situation in which a propagation speed distribution of only a section of a predetermined layer of the geological layer is changed by injection of the carbonic acid gas ($CO_2$ gas) is set. A value illustrated in FIG. 6 is a change amount of a propagation speed.

In this embodiment, in the environment of the numerical experiments, it is assumed that a speed distribution illustrated in FIG. 6 is in an unknown state and in the seismic sources illustrated in FIG. 5, the seismic waves are triggered and measurement is performed by the well V2. In addition, it is confirmed that the speed distribution illustrated in FIG. 6 can be estimated from observation data and seismic source information simulatively obtained by the well V2 using the signal processing device 1. An observation result is illustrated in FIGS. 7 to 9.

Figure 8:
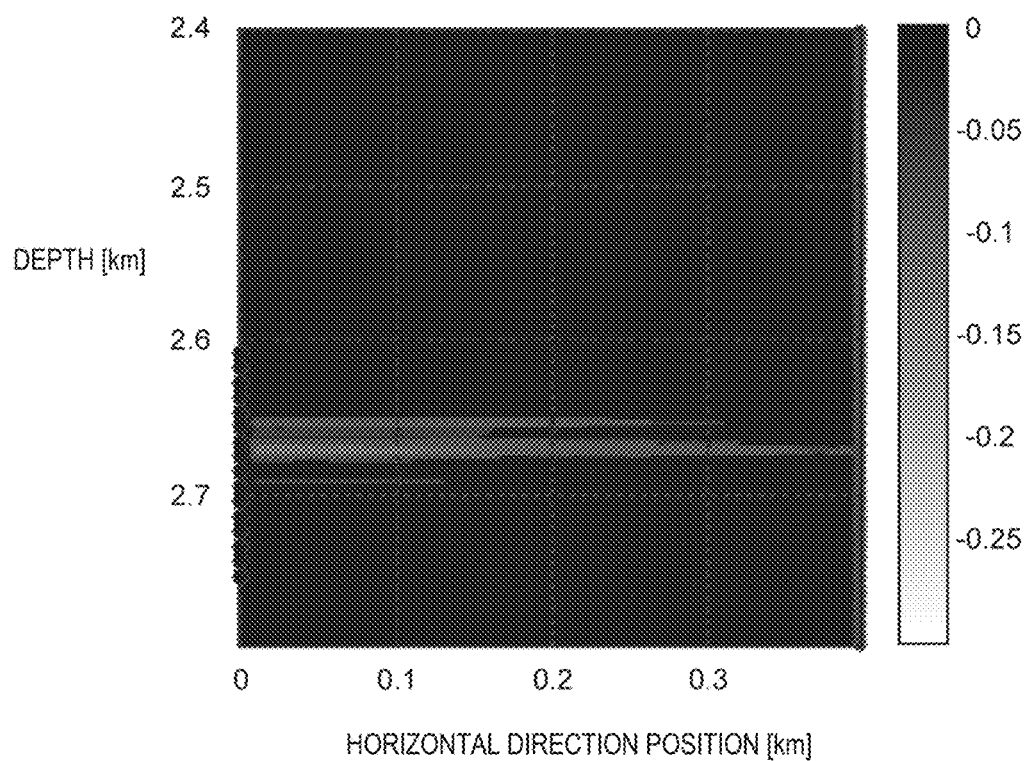
FIG. 8 is a diagram illustrating a result of the numerical calculation according to the embodiment.

A result illustrated in FIG. 8 is obtained by executing inverse analysis of the simulated observation data. FIG. 7 illustrates a result obtained by imaging waves propagating horizontally from the well V1 to the well V2. FIG. 7 illustrates a result measured by the seismometer $Vr_n$ of the well V2. In the seismometer $Vr_n$, a horizontal direction is set to Vh and a vertical direction is set to Vv. In FIG. 7, a propagation aspect of elastic waves triggered in a seismic source shown by a circle of FIG. 8 can be confirmed.

As illustrated in FIGS. 8 and 9, a propagation speed distribution obtained by inversion analysis is obtained. FIG. 8 illustrates a calculation result obtained by updating the solid model once and FIG. 9 illustrates a calculation result obtained by updating the solid model several times.

Particularly, as illustrated in FIG. 8, because a refractive index for the elastic wave is different in a layer of a different propagation speed, a specific wave is confined in the layer. For this reason, a wave propagating through the soft geological layer is trapped. The soft geological layer is a low-speed layer in which a speed is slow. The wave trapped to the low-speed layer is called a guided wave and amplitude is strong because a medium is soft. The guided wave is called a channel wave and a seam wave.

As such, because the guided wave can be calculated, the seismic waves passing through the thin low-speed layer can be analyzed with high precision. In addition, a wave (P wave) propagating early propagates farthest away. However, first arrival time is hard to become clear. Particularly, because hardness of rock is different for each geological layer, propagation of the vibration is hard to become uniform. However, the solid model is used, so that precision of propagation of the P wave is high. Because the vibration is strong, analysis precision can be further improved by using observation data of time until the S wave in which arrival time becomes clear arrives.

In this embodiment, estimation precision using the P wave is improved by performing estimation using the solid model. In addition, the S wave not used in the related art is used during the signal process. Because the S wave propagates late, the S wave is observed in a state in which components of a variety of reflected waves are overlapped. In a fluid model according to the related art, the S wave is removed for a process. However, the solid model is used, instead of the fluid model not using the S wave, and analysis is performed using the S wave and the P wave, so that estimation precision is improved as compared with when only the P wave is used.

Particularly, because a sensor observes a wave having passed through the oil layer, the wave is divided into the horizontal component and the vertical component and the analysis is performed. As a result, resolution of a vertical component direction increases and propagation of the wave of the vertical direction becomes clear.

In the related art, an acoustic signal from a vibration source is detected by an acoustic detecting element array arranged in a penetration direction of the oil layer and the acoustic signal is inversely analyzed according to an acoustic propagation characteristic of the P wave. However, in information based on the P wave such as the acoustic signal, if the magnitude of a region of which a signal propagation characteristic is changed by gas injection is not sufficiently smaller than a wavelength of a sound, the behavior thereof is complicated. For this reason, it is difficult to obtain sufficient information for the magnitude of the propagation speed change region. Meanwhile, when vibration of a long wavelength is used, the detail of the region of the magnitude smaller than the wavelength is unclear. For this reason, substantial information is not obtained. In this embodiment, the solid model is used, so that the distribution of the propagation speed is calculated on the basis of the propagation characteristic of the elastic waves. Therefore, the resolution is improved. In addition, because the guided wave is calculated by using the solid model, the resolution is improved as compared with the case of using the acoustic signal in the related art.

The present invention is not limited to the embodiment described above. For example, a seismic source may be arranged in the vicinity of an earth's surface. As the seismic source in the vicinity of the earth's surface, vibroseis can be exemplified. In addition, an air gun may be used as the seismic source in an offshore oilfield. Even in such a configuration, the function and the effect described above can be achieved.

In two observation wells provided from the earth's surface to the oil layer, a vibration generating device may be provided in the first observation well, the second observation well arranged to be separated from the first observation well may be excavated to penetrate the oil layer in general, and n (n is an integer of 1 or more) vibration detecting elements may be arranged in an inner portion thereof with the oil layer therebetween.

INDUSTRIAL APPLICABILITY

The present invention can be used as a signal processing device and a signal processing method to grasp a structure of an underground geological layer.

REFERENCE SIGNS LIST

1 . . . signal processing device, 2 . . . vibration generating unit, 3 . . . vibration receiving unit, 11 . . . measurement signal input unit, 12 . . . seismic source information acquiring unit, 20 . . . signal processing unit, 21 . . . vibration propagation speed data storage unit, 22 . . . simulated vibration propagation speed data storage unit, 23 . . . model storage unit, 24 . . . propagation speed distribution information storage unit, 30 . . . display unit

What is claimed is:
1. A signal processing device that processes a measurement signal received by a vibration receiving means receiving vibration generated by a vibration generating means generating the vibration in an underground structure region having a plurality of regions of vibration propagation speeds, and detects extensions of gas injection regions in the underground structure region during an enhanced oil recovery operation, the signal processing device comprising:
a measurement signal accumulating means for accumulating a first measurement signal having received first vibration generated by the vibration generating means and a second measurement signal having received second vibration generated at a time interval from generation of the first vibration during the enhanced oil recovery operation, wherein the first vibration is received before carbonic acid gas is injected into the underground structure and the second vibration is received after the carbonic acid gas is injected into the underground structure;

a vibration propagation speed data accumulating means for accumulating data of the vibration propagation speed calculated from the measurement signals;
a propagation speed calculating means for calculating strength and a direction of the vibration in the underground structure region using a calculation model including the data of the vibration propagation speed;
a propagation speed distribution information accumulating means for accumulating propagation speed distribution information in the underground structure region calculated by the propagation speed calculating means;
a simulated signal input means for inputting seismic source information obtained by simulating the vibration generating means to the calculation model;
a simulated propagation speed calculating means for inputting the seismic source information to the calculation model by the simulated signal input means and calculating the strength and the direction of the vibration in the underground structure region using the calculation model;
a simulated propagation speed distribution information accumulating means for accumulating simulated propagation speed distribution information calculated by the simulated propagation speed calculating means;
an update amount calculating means for calculating an update amount to update the calculation model, on the basis of the propagation speed distribution information and the simulated propagation speed distribution information; and
an updating means for updating, during the enhanced oil recovery operation, the calculation model using the update amount,
wherein the calculation model is a solid model, and
the propagation speed calculating means calculates strength and a direction of the first vibration using the first measurement signal input to the calculation model and calculates strength and a direction of the second vibration using the second measurement signal input to the calculation model.

2. The signal processing device according to claim 1, further comprising:
a measurement signal input means for inputting the first measurement signal having received the first vibration generated by the vibration generating means and the second measurement signal having received the second vibration generated at the time interval from the generation of the first vibration; and
a display means for displaying the propagation speed distribution information,
wherein the display means compares and displays first propagation speed distribution information calculated from the first vibration by the propagation speed calculating means and second propagation speed distribution information calculated from the second vibration by the propagation speed calculating means.

3. The signal processing device according to claim 2, wherein the first measurement signal and the second measurement signal are measurement signals including vibration of a channel wave in the vicinity of a characteristic layer in a select region of the plurality of regions of vibration propagation speeds.

4. The signal processing device according to claim 2, wherein the propagation speed calculating means calculates the strength and the direction of the vibration by backward propagation using the calculation model, the simulated propagation speed calculating means calculates the strength and the direction of the vibration by forward propagation using the calculation model, and the update amount calculating means sets a value obtained by calculating a mutual correlation of the propagation speed distribution information and the simulated propagation speed distribution information as the update amount.

5. The signal processing device according to claim 2, wherein the update amount calculating means sets a value obtained by calculating a mutual correlation of a P-wave component of the propagation speed distribution information and a P-wave component of the simulated propagation speed distribution information as the update amount.

6. The signal processing device according to claim 2, wherein the second propagation speed distribution information is calculated by a sum of the first propagation speed distribution information and the update amount.

7. The signal processing device according to claim 2, wherein the propagation speed calculating means uses a difference of the first measurement signal and the second measurement signal input to the calculation model to calculate strength and a direction of the difference, and the display means displays propagation speed difference distribution information calculated from the difference by the propagation speed calculating means.

8. The signal processing device according to claim 2, wherein the first measurement signal and the second measurement signal include vibration of a channel wave arriving earlier than an S-wave body, and the display means targets the vibration of the channel wave arriving earlier than the S-wave body of each of the first propagation speed distribution information and the second propagation speed distribution information.

9. The signal processing device according to claim 2, wherein the propagation speed calculating means uses a difference of the first measurement signal and the second measurement signal input to the calculation model to calculate strength and a direction of the difference in time series, and the display means displays propagation speed difference distribution information calculated from the difference by the propagation speed calculating means in time series.

10. The signal processing device of claim 1, wherein:
the first vibration is a first elastic wave generated by an artificial seismic source; and
the second vibration is a second elastic wave generated by the artificial seismic source.

11. A signal processing method that is executed by a signal processing device to process a measurement signal received by a vibration receiving step of receiving vibration generated by a vibration generating step of generating the vibration in the underground structure region having a plurality of regions of vibration propagation speeds, and detects extensions of gas injection regions in the underground structure region during an enhanced oil recovery operation, the signal processing method comprising:

a measurement signal accumulating step of accumulating a first measurement signal having received first vibration generated by the vibration generating step and a second measurement signal having received second vibration generated at a time interval from generation of the first vibration during the enhanced oil recovery operation, wherein the first vibration is received before carbonic acid gas is injected into the underground structure and the second vibration is received after the carbonic acid gas is injected into the underground structure;

a vibration propagation speed data accumulating step of accumulating data of the vibration propagation speed calculated from the measurement signals;

a propagation speed calculating step of calculating strength and a direction of the vibration using a calculation model including the data of the vibration propagation speed;

a propagation speed distribution information accumulating step of accumulating propagation speed distribution information calculated by the propagation speed calculating step;

a simulated signal input step of inputting seismic source information obtained by simulating the vibration generating step to the calculation model;

a simulated propagation speed calculating step of inputting the seismic source information to the calculation model by the simulated signal input step and calculating the strength and the direction of the vibration using the calculation model;

a simulated propagation speed distribution information accumulating step of accumulating simulated propagation speed distribution information calculated by the simulated propagation speed calculating step;

an update amount calculating step of calculating an update amount to update the calculation model, on the basis of the propagation speed distribution information and the simulated propagation speed distribution information;

an updating step of updating, during the enhanced oil recovery operation, the calculation model using the update amount; and a display step of displaying the propagation speed distribution information, wherein the calculation model is a solid model, and the propagation speed calculating step calculates strength and a direction of the first vibration using the first measurement signal input to the calculation model and calculates strength and a direction of the second vibration using the second measurement signal input to the calculation model.

12. A signal processing device that processes a measurement signal received by a vibration receiving means receiving vibration generated by a vibration generating means generating the vibration in an underground structure region having a plurality of regions of vibration propagation speeds, and detects extensions of gas injection regions in the underground structure region during an enhanced oil recovery operation, the signal processing device comprising:

circuitry configured to accumulate a first measurement signal having received first vibration generated by the vibration generating means and a second measurement signal having received second vibration generated at a time interval from generation of the first vibration during the enhanced oil recovery operation, wherein the first vibration is received before carbonic acid gas is injected into the underground structure and the second vibration is received after the carbonic acid gas is injected into the underground structure, accumulate data of the vibration propagation speed calculated from the measurement signals, calculate strength and a direction of the vibration in the underground structure region using a calculation model including the data of the vibration propagation speed, accumulate propagation speed distribution information in the underground structure region, input seismic source information obtained by simulating the vibration generating means to the calculation model, input the seismic source information to the calculation model and calculate the strength and the direction of the vibration in the underground structure region using the calculation model, accumulate simulated propagation speed distribution information, calculate an update amount to update the calculation model, on the basis of the propagation speed distribution information and the simulated propagation speed distribution information, and update, during the enhanced oil recovery operation, the calculation model using the update amount, wherein the calculation model is a solid model, and the circuitry calculates strength and a direction of the first vibration using the first measurement signal input to the calculation model and calculates strength and a direction of the second vibration using the second measurement signal input to the calculation model.

\* \* \* \* \*